United States Patent [19]
George

[11] Patent Number: 5,949,499
[45] Date of Patent: *Sep. 7, 1999

[54] POWER SENSOR CIRCUIT FOR A CONFERENCE SYSTEM

[75] Inventor: John Barrett George, Carmel, Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/821,189

[22] Filed: Mar. 19, 1997

[51] Int. Cl.⁶ .................................................. H04N 5/63
[52] U.S. Cl. ............................................ 348/730; 348/745
[58] Field of Search .................................... 348/730, 746, 348/745, 744, 807, 844, 377, 378, 806, 180, 189, 190; 315/411, 364, 368.11, 368.12, 368.13, 368.15, 368.17, 368.25, 368.27

[56] References Cited

U.S. PATENT DOCUMENTS

| | | |
|---|---|---|
| 4,042,858 | 8/1977 | Collette et al. .......................... 315/379 |
| 4,197,558 | 4/1980 | Rutishauser .............................. 348/634 |
| 4,716,463 | 12/1987 | Stacy et al. .............................. 358/190 |
| 4,814,671 | 3/1989 | Oguino et al. ........................... 315/368 |
| 5,327,172 | 7/1994 | Tan et al. ................................. 348/378 |
| 5,583,820 | 12/1996 | Padoan et al. .......................... 365/226 |
| 5,784,127 | 6/1998 | Gleim et al. ............................. 348/730 |

OTHER PUBLICATIONS

"A Universal Power Supply Integrated Circuit For TV And Monitor Applications," by Philippe Maige, published in *IEEE Transactions on Consumer Electronics*, vol. 36, No. 1, Feb., 1990, New York, USA.

PCT International Search Report for counterpart international application No. PCT/US 98/04708.

*Primary Examiner*—Chris Grant
*Attorney, Agent, or Firm*—Joseph S. Tripoli; Joseph J. Laks; Daniel E. Sragow

[57] ABSTRACT

A power sensor circuit for use in a convergence system which comprises a convergence circuit for generating a convergence correction signal. The power sensor circuit receives at least one supply voltage and generates an output signal having a magnitude selected in accordance with whether the at least one supply voltage is above a first threshold. The output signal is coupled to the convergence circuit, which enables or disables the convergence correction signal in response to the magnitude of the output signal.

35 Claims, 2 Drawing Sheets

POWER SENSOR CIRCUIT FOR A CONFERENCE SYSTEM

BACKGROUND OF THE INVENTION

1. Field of the Invention

The present invention relates to power sensor circuits and, in particular, to power sensor circuits for use with digital convergence systems used with cathode-ray tubes.

2. Description of the Related Art

Electrical components such as integrated circuits (ICs) and amplifiers are commonly coupled to power supply devices that provide various supply voltages to the components. When a power supply device fails for some reason, the electrical components receiving supply voltages from the power supply are invariably affected, which can lead to undesired results, depending on the nature of the electrical components.

For example, in television (TV) systems such as projection TV cathode ray tube (CRT) systems, there are typically three CRT units, one for each of the colors red, green, and blue. In order to correct a display artifact known as vertical pincushion distortion, a convergence system is utilized to provide a convergence correction wave form or signal to each of the red, blue, and green CRT units. These convergence correction signals correct for the vertical pincushion distortion effect and other distortions, thereby helping to maintain a linear, nondistorted picture on the screen of each CRT. Typically, the convergence system contains a digital convergence IC, a pre-amplifier (preamp), and a power amplifier (power amp). The digital convergence IC generates the correction signal, typically a current, which is applied to the preamp for signal conditioning and differential amplification. The preamp provides an output voltage which is applied to the power amp for power amplification before coupling to a convergence yoke coil. The preamp typically contains one or more operational amplifiers (op amps).

The digital convergence IC, as well as the preamp and the power amp, require various supply voltages to function properly. For example, the digital convergence IC may require a +5V input voltage, and the preamp and power amp may require both +15V and −15V power supply voltages. If, for some reason, the +5V input to the digital convergence IC is disturbed while the IC is providing the correction signal to the preamp, undesired effects may occur. For example, the digital convergence IC may generate inappropriate waveforms, which could damage or destroy the power amp, since the power amp is inductively loaded and produces excessive heat with improper signals (such as signals with DC components).

Additionally, if either of the +15V or −15V power supply voltages are disturbed while the IC is powered by the +5V input and is providing the correction signal to the preamp, undesired effects may cause the preamp or power amp to generate inappropriate amplified signals, which could damage or destroy the power amp or other components of the convergence system.

SUMMARY OF THE INVENTION

A power sensor circuit for use in a convergence system which comprises a convergence circuit for generating a convergence correction signal. The power sensor circuit receives at least one supply voltage and generates an output signal having a magnitude selected in accordance with whether the at least one supply voltage is above a first threshold. The output signal is coupled to the convergence circuit, which enables or disables the convergence correction signal in response to the magnitude of the output signal.

DETAILED DESCRIPTION OF THE PREFERRED EMBODIMENTS

Figure 1:
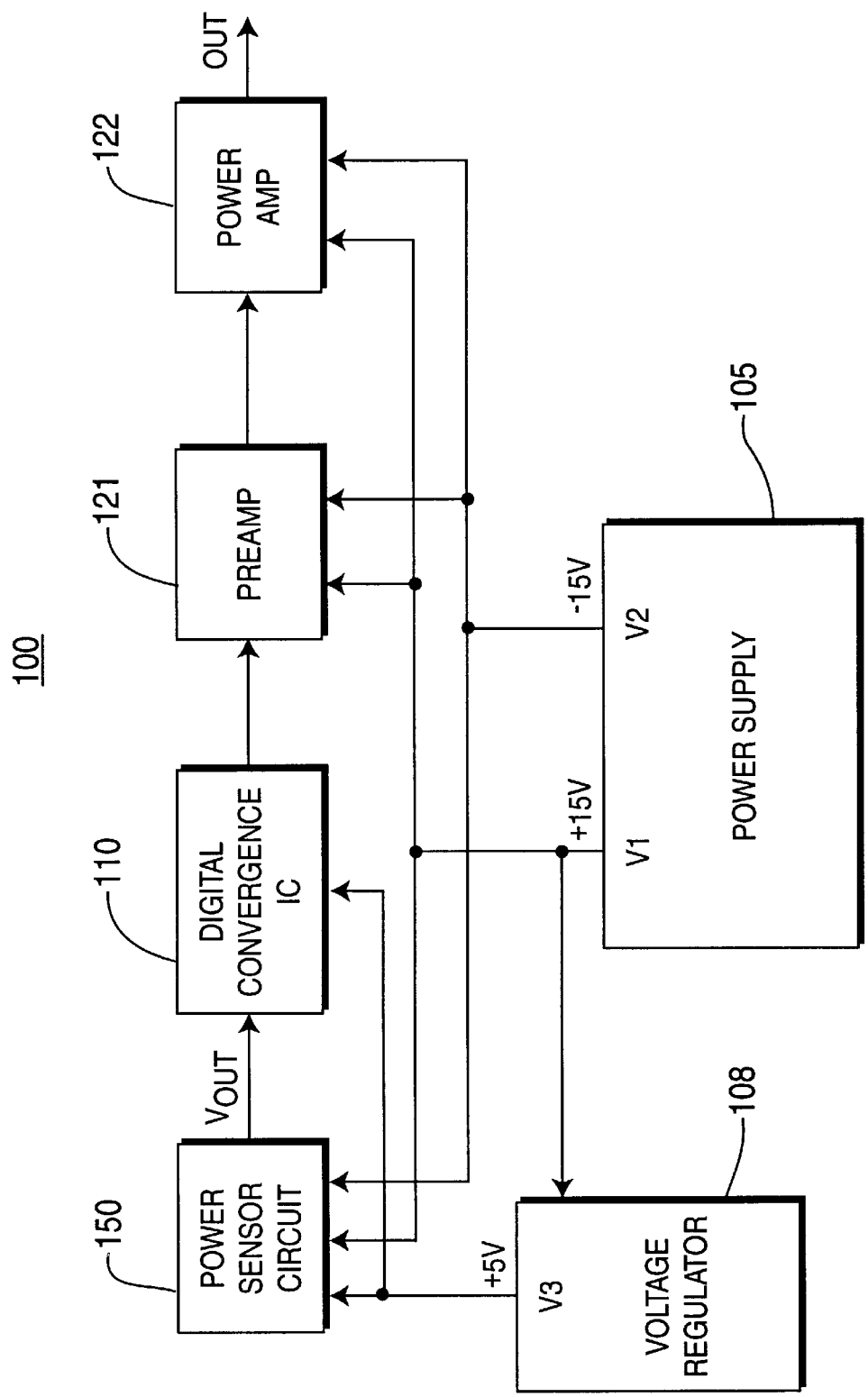
FIG. 1 is a block diagram of a convergence system including a power sensor circuit in accordance with the present invention.

Referring now to FIG. 1, there is shown a block diagram of a convergence system 100 including a power sensor circuit 150 in accordance with the present invention. Convergence system 100 includes a power supply 105, voltage regulator 108, power sensor circuit 150, digital convergence IC 110, preamp 121, and power amp 122. In the present invention, power sensor circuit 150 is utilized to enable digital convergence IC 110 only when the relevant supply voltages are being supplied at appropriate levels.

Digital convergence IC 110 generates a correction signal, which is used to correct for vertical pincushion distortion and other distortions, as described above. The correction signal is conditioned by preamp 121 to provide a filtered or processed correction signal, which is then amplified by power amp 122, to provide an amplified output correction signal voltage at the pin marked "OUT". This amplified output voltage wave form is applied to a convergence yoke coil of a CRT unit (not shown).

Power supply 105 provides supply voltages V1 and V2, which have nominal magnitudes of +15V and −15V, respectively, during normal operation. One skilled in the art may choose different values for supply voltages V1 and V2 depending upon circuit, signal, and load requirements. Voltages V1 and V2 are provided to preamp 121 and power amp 122 to provide power supplies for these devices. Voltages V1 and V2 are also applied as inputs to power sensor circuit 150. Voltage V1 is further applied as an input voltage to voltage regulator 108, which uses voltage V1 to derive an output voltage V3 having a magnitude of approximately +5V. Voltage V3 is coupled to digital convergence IC 110 to power the IC 110, and also to power sensor circuit 150. Output voltage $V_{out}$ of power sensor circuit 150 is coupled at its output terminal to an enable input terminal of digital convergence IC 110.

During normal operation, voltage V1 is above a respective predetermined threshold and voltage V2 is below a predetermined threshold. In one embodiment, these thresholds are nominally +12V and −12V, respectively. The actual values of the predetermined thresholds may be varied in accordance with circuit, signal, and load requirements. The normal range of voltage V1 in this embodiment is thus any voltage above approximately +12V, typically between approximately +12V and approximately +15V. Similarly, the normal range of voltage V2 is any voltage below (i.e., greater in magnitude than) approximately −12V, typically between approximately −12V and approximately −15V. When each of these voltages is within its normal range, power sensor circuit 150 provides an output voltage $V_{out}$ of approximately +2.5V to the enable input terminal of IC 110. (In the present application, if voltage V2 rises above its negative threshold of approximately −12V, for ease of reference this will be referred to as falling below its threshold.) If the magnitude of any one of these three voltages falls below its respective threshold, then power sensor circuit changes $V_{out}$ from approximately +2.5V to approximately ground, or 0V.

Digital convergence IC 110 is configured with comparator circuitry (not shown) coupled to its enable input terminal to monitor the $V_{out}$ signal from power sensor circuit 150 so that digital convergence IC 110 shuts down if $V_{out}$ falls below a predetermined minimum voltage, for example approximately +1.5V. In one embodiment, IC 110 is configured so that IC 110 is enabled as long as $V_{out}$ is within approximately 2.5V ±1V. Thus, as long as Vout is within the range between approximately +1.5V and approximately +3.5V, IC 110 is enabled. When IC 110 is enabled, it provides a correction signal to preamp 121 in the form of currents to preamp 121. Preamp 121 provides for low-pass filtering and differential amplification of the input correction signal currents, and provides an output voltage signal to power amp 122. When either of voltages V1 and V2 falls below its threshold, $V_{out}$ is changed from approximately +2.5V to approximately 0V, thereby causing IC 110 to shut down when it senses that $V_{out}$ is less than approximately +1.5V.

In one embodiment, IC 110 shuts down by disabling the current sources of IC 110 that provide the correction signal current to preamp 121, for example by switching output currents to zero while maintaining a high impedance. IC 110 also shuts down by muting the output of preamp 121 by switching the output of preamp 121 to ground, so that preamp 121 does not provide an output voltage to power amp 122. This prevents power amp 122 from amplifying a harmful type of signal, for example a signal with a DC component, which could destroy power amp 122 when providing an amplified signal to a yoke inductance coil. A DC component is carefully limited as part of the signal applied to power amp 122 during normal operation, but could become unlimited if the input supply voltage V3 applied to IC 110 is disturbed while IC 110 is enabled.

For example, suppose that, during normal operation, voltage V1 falls below its threshold of approximately +12V, causing voltage $V_{out}$ to fall from approximately +2.5V to approximately 0V, which in turn causes IC 110 to shut down. At this point, voltage V3 will still have a magnitude of approximately +5V for a short time, since voltage regulator 108 allows for a considerable amount of variation in the input voltage V1 before the output voltage V3 is affected. For example, voltage V3 remains at approximately +5V until voltage V1 drops below approximately +10V. In the present invention, IC 110 is thus shut down before voltage V3 begins to fall, thereby preventing the aforementioned problem that can arise when voltage V3, which is applied to IC 110, is disturbed before IC 110 is shut down.

During start up of convergence system 100, voltages V1, V2, and V3 are initially approximately 0V, and consequently $V_{out}$ equals approximately 0V. Voltages V1 and V2 begin to ramp up in magnitude, towards +15V and -15V, respectively. Until voltage V1 is approximately +8V, voltage V3 equals 0V. When voltage V1 reaches approximately +8V, voltage regulator 108 has reached a sufficient input voltage to derive an output, and voltage V3 increases from approximately 0V to approximately +5V. When voltages V1 and V2 reach their respective threshold voltages of approximately +12V and approximately -12V, a delay of approximately 5 milliseconds is initiated. After the delay of 5 ms, $V_{out}$ switches from approximately 0V to approximately +2.5V. Thus, during start up, or after IC 110 has been disabled by $V_{out}$ switching to 0V, there is an approximately 5 ms delay after all three voltages V1, V2, and V3 have reached their respective threshold voltages, before IC 110 is enabled.

This delay prevents IC 110 from erroneously being enabled when noise in convergence system 100 could momentarily cause each voltage V1, V2, V3 to exceed its threshold. The delay also helps to keep IC 110 from successively being enabled and disabled if one or more of voltages V1 or V2 is hovering around its respective threshold voltage.

Figure 2:
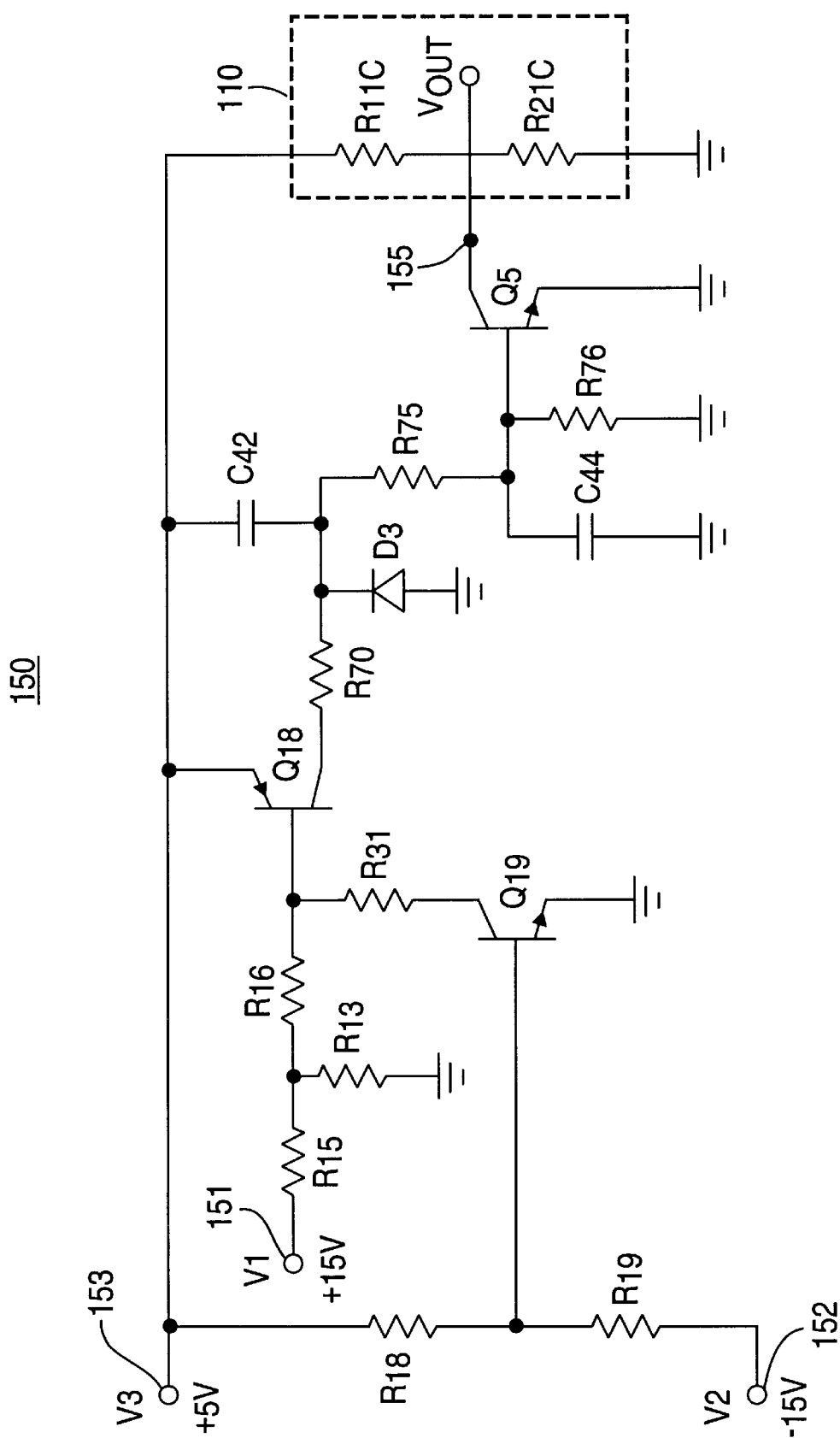
FIG. 2 is a schematic diagram of the power sensor circuit of the convergence system of FIG. 1.

Referring now to FIG. 2, there is shown a schematic diagram of the power sensor circuit 150 of convergence system 100 of FIG. 1. Circuit 150 is coupled at input terminals 151, 152, and 153 to input voltages V1, V2, and V3, respectively, as also illustrated in FIG. 1. Circuit 150 provides an output enable voltage $V_{out}$ at output terminal 155, which is coupled to the enable input of digital convergence IC 110. Input terminal 151 of circuit 150 is coupled through resistor R15 to terminals of resistors R13 and R16. The other terminal of resistor R13 is coupled to ground, and the other terminal of resistor R16 is coupled to a terminal of resistor R31 and to the base of pnp transistor Q18.

Input terminal 152 is coupled through resistor R19 to a terminal of resistor R18 and to the base of npn transistor Q19. The emitter of transistor Q19 is coupled to ground, and the collector of transistor Q19 is coupled, through resistor R31, to the base of transistor Q18. Input terminal 153 is coupled through resistor R18 to the junction of the base of transistor Q19 and resistor R19, to the emitter of transistor Q18, to a terminal of capacitor C42, and to a terminal of resistor R11C, which is a component of IC 110.

The collector of transistor Q18 is coupled through resistor R70 to the junction of the cathode of diode D3 and terminals of capacitor C42 and resistor R75. The anode of diode D3 is coupled to ground, and the other terminal of resistor R75 is coupled to the junction of the base of transistor Q5 and terminals of capacitor C44 and resistor R76, the other terminals of which are coupled to ground. The emitter of transistor Q5 is also coupled to ground, and the collector of transistor Q5 is coupled at output terminal 155 to the enable input of digital convergence IC 110, and also to the junction of resistors R11C and R21C of IC 110. The other terminal of resistor R21C is coupled to ground.

In one embodiment, the components and parameters of power sensor circuit 150 have the following values: R18=5.1 KΩ; R19=12 KΩ; R15=7.5 KΩ; R16=10 KΩ; R13=5.1 KΩ; R31=10 KΩ; R70=100Ω; R76=39 KΩ; R75=39 KΩ; C42=0.15 μF; C44=0.15 μF. Transistor Q19 is preferably of type MPSA20; transistor Q18 is of type MPSA55; and transistor Q5 is of type MPSA20. Diode D3 is of type d1n4148. Resistors R11C, R21C of IC 110 each have a value of 10 KΩ. Voltage regulator 108 of convergence system 100 is a type 7805 voltage regulator, and power supply 105 is a switch mode power supply.

As will be appreciated, power sensor circuit 150 is configured to perform the above-described functions. During normal operation, in power sensor circuit 150, since voltage V3 is derived from a voltage regulator, it is typically a relatively constant +5V during the time when either voltage V1 or voltage V2 would begin to drop out of a normal range and approach their thresholds. Voltage V3 is therefore used as a reference by circuit 150, against which voltages V1 and V2 are measured.

If voltage V1 drops below its threshold of approximately +12V, the voltage across resistor R13 caused by the voltage divider network formed from resistors R15 and R13 will drop below approximately +5V, which will cause transistor Q18 to be biased on, which simultaneously causes capacitor C42 to short and causes transistor Q5 to be turned on. When transistor Q5 is turned on, voltage $V_{out}$ is pulled down to ground, thereby causing IC 110 to be disabled. Thus, if voltage V1 drops below its threshold of approximately +12V, this causes IC 110 to be disabled.

Similarly, resistors R18 and R19 form a voltage divider network that divides voltage V2 and compares it to the +5V reference voltage V3. If voltage V2 drops out of its normal range by reaching its threshold voltage of approximately −12V, the voltage at the base of transistor Q19 causes transistor Q19 to turn on, which thus causes transistor Q18 to turn on. As explained previously, turning transistor Q18 on ultimately causes IC 110 to be disabled. Even if a drop in voltage V2 does not imply a drop in voltage V1 and, therefore, in voltage V3 (which is derived from voltage V1), it is still advantageous to shut down IC 110 if voltage V2 falls below its threshold, since this could cause damage to power amp 122 or other components of convergence system 100.

During initial start up, capacitor C42 performs the above-described delay function. As described above, voltages V1 and V2 begin to ramp up in magnitude, towards +15V and −15V, respectively. Until voltage V1 reaches approximately +8V, voltage V3 equals approximately 0V. When voltage V1 is approximately +8V, voltage V3 quickly increases from approximately 0V to approximately +5V. Transistor Q5 then immediately turns on since, at this point, capacitor C42 has not been charged. However, transistor Q18 is still on at this point, since voltages V1 and V2 have not yet reached their respective threshold voltages of approximately +12V and approximately −12V. Thus, since transistor Q18 is still on, this keeps capacitor C42 shorted, thereby keeping it in a discharged state, and thus transistor Q5 stays on. When voltages V1 and V2 reach their respective threshold voltages of approximately +12V and approximately −12V, transistors Q18 and Q19 both turn off. At this point, capacitor C42 begins charging and the voltage potential at the terminal of capacitor C42 coupled to diode D3 tends toward ground from approximately +5V. The terminal of capacitor C42 coupled to the cathode of diode D3 takes approximately 5 ms to drop from a potential of approximately +5V to approximately +1.2V, at which point transistor Q5 will turn off. Thus, after the delay of approximately 5 ms, $V_{out}$ switches from approximately 0V to approximately +2.5V.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A power sensor circuit for a convergence circuit in a television receiver, the power sensor circuit comprising:
    means for receiving a first supply voltage; and
    means for generating an output signal having a magnitude selected in accordance with whether the first supply voltage is above a first threshold; wherein:
        the convergence circuit comprises means for generating a convergence correction signal, an input for receiving the output signal, and means for enabling or disabling the means for generating the convergence correction signal in response to the magnitude of the output signal.

2. The power sensor circuit of claim 1, further comprising means for receiving a second supply voltage, wherein the magnitude of the output signal is further selected in accordance with whether the second supply voltage is above a second threshold.

3. The power sensor circuit of claim 2, wherein the output signal has a first magnitude when both the first and second supply voltages exceed their respective thresholds and the output signal has a second magnitude otherwise.

4. The power sensor circuit of claim 2, further comprising means for changing the magnitude of the output signal from a second magnitude to a first magnitude a predetermined time delay period after both the first and second supply voltages exceed their respective thresholds.

5. The power sensor circuit of claim 2, wherein:
    the first supply voltage has a positive magnitude and the second supply voltage has a negative magnitude; and
    the convergence circuit further comprises a preamp for receiving and filtering the correction signal, the preamp having means for receiving the first and second supply voltages to provide power to the preamp.

6. The power sensor circuit of claim 5, wherein the convergence circuit further comprises a power amplifier for receiving and amplifying the filtered correction signal provided by the preamp, the power amplifier having means for receiving the first and second supply voltages to provide power to the power amplifier.

7. The power sensor circuit of claim 5, wherein the convergence circuit further comprises means for disabling the output of the preamp by switching the output of the preamp to ground in response to the magnitude of the output signal.

8. The power sensor circuit of claim 1, wherein the convergence circuit further comprises means for receiving the first supply voltage and for deriving a derived voltage from the first supply voltage.

9. The power sensor circuit of claim 8, wherein the means for receiving the first supply voltage and for deriving a derived voltage from the first supply voltage is a voltage regulator, wherein the magnitude of the derived voltage is less than the magnitude of the first supply voltage.

10. The power sensor circuit of claim 8, wherein the convergence circuit comprises means for receiving the derived voltage to provide power to the convergence circuit.

11. A power sensor circuit for providing an output signal to a convergence circuit in a television receiver, said power sensor circuit comprising:
    an input source of voltage potential;
    a reference source of reference voltage potential derived from said input source;
    a first transistor having a base electrode coupled to said input source and an emitter electrode coupled to said reference source; and
    delay means responsive to a conductive state of said transistor for providing said output signal to said convergence circuit a predetermined time after a change in said conductive state of said transistor.

12. The power sensor circuit of claim 11, wherein said transistor changes from a conductive state to a non-conductive state when said voltage potential of said input source exceeds a first predetermined threshold value.

13. The power sensor circuit of claim 12, wherein said delay means comprises a capacitor having first and second terminals terminal coupled, respectively, to said emitter electrode and a collector electrode of said transistor.

14. The power sensor circuit of claim 13, wherein said output signal is enabled when a voltage at said second terminal of said capacitor falls below a second predetermined threshold voltage.

15. A convergence system for a television receiver, said convergence system comprising:
    a convergence correction circuit for providing a convergence correction signal; and
    a power supply sensing circuit coupled to said convergence correction circuit for monitoring the condition of a power supply coupled to said convergence system.

16. The convergence system of claim 15, wherein said power supply sensing circuit inhibits operation of said convergence correction circuit when the magnitude of a power supply voltage falls below a threshold level.

17. A convergence system for a television receiver, said convergence system comprising:
   a convergence correction circuit for providing a convergence correction signal; and
   a power supply sensing circuit coupled to said convergence correction circuit for monitoring the condition of a power supply coupled to said convergence system;
   wherein:
      said power supply sensing circuit inhibits operation of said convergence correction circuit when the magnitude of a power supply voltage falls below a threshold level; and
      said convergence system further comprises a preamp for receiving and filtering said convergence correction signal, said preamp having means for receiving said power supply voltage to provide power to said preamp.

18. The convergence system of claim 17, wherein said convergence system further comprises means for disabling the output of said preamp by switching the output of said preamp to ground when the magnitude of said power supply voltage falls below a threshold level.

19. The convergence system of claim 17, wherein said convergence system further comprises a power amplifier for receiving and amplifying said filtered convergence correction signal provided by said preamp, said power amplifier having means for receiving said power supply voltage to provide power to said power amplifier.

20. The convergence system of claim 17, wherein said convergence system further comprises means for deriving a derived voltage from said power supply voltage.

21. The convergence system of claim 20, wherein said means for deriving a derived voltage from said power supply voltage comprises a voltage regulator, wherein the magnitude of said derived voltage is less than the magnitude of said power supply voltage.

22. The convergence system of claim 21, wherein said derived voltage is coupled to said power supply sensing circuit and to said convergence correction circuit.

23. An arrangement for sensing a power supply voltage in a convergence system for a television receiver, said arrangement comprising:
   means for receiving said power supply voltage; and
   means for generating an output signal having a magnitude selected in accordance with whether said power supply voltage is above a threshold level;
   wherein said convergence system comprises:
      means for generating a convergence correction signal;
      an input for receiving said output signal; and
      means for enabling or disabling said means for generating a convergence correction signal in response to the magnitude of said output signal.

24. The arrangement of claim 23, wherein said output signal has a first magnitude when said power supply voltage exceeds its respective threshold level and a second magnitude otherwise.

25. The arrangement of claim 23, further comprising means for changing the magnitude of said output signal from a second magnitude to a first magnitude a predetermined time delay period after said power supply voltage exceeds its respective threshold level.

26. The arrangement of claim 25, wherein said convergence system further comprises a preamp for receiving and filtering said convergence correction signal, said preamp having means for receiving said power supply voltage to provide power to said preamp.

27. The arrangement of claim 26, wherein said convergence system further comprises means for disabling the output of said preamp by switching the output of said preamp to ground in response to the magnitude of said output signal.

28. The arrangement of claim 26, wherein said convergence system further comprises a power amplifier for receiving and amplifying said filtered convergence correction signal provided by said preamp, said power amplifier having means for receiving said power supply voltage to provide power to said power amplifier.

29. The arrangement of claim 23, wherein said convergence system further comprises means for deriving a derived voltage from said power supply voltage.

30. The arrangement of claim 29, wherein said means for deriving a derived voltage from said power supply voltage comprises a voltage regulator, wherein the magnitude of said derived voltage is less than the magnitude of said power supply voltage.

31. The arrangement of claim 30, wherein said derived voltage is coupled to said arrangement and to said convergence correction circuit.

32. An arrangement for providing an output signal to a convergence system in a television receiver, said arrangement comprising:
   an input source of voltage potential;
   a source of reference voltage potential derived from said input source;
   a first transistor having a control electrode coupled to said input source and an output electrode coupled to said reference source; and
   delay means responsive to a conductive state of said transistor for providing said output signal to said convergence system a predetermined time after a change in said conductive state of said transistor.

33. The arrangement of claim 32, wherein said transistor changes from a conductive state to a non-conductive state when said voltage potential of said input source exceeds a first threshold level.

34. The arrangement of claim 33, wherein said delay means comprises a capacitor having first and second terminals coupled, respectively, to said output electrode and an input electrode of said transistor.

35. The arrangement of claim 34, wherein said output signal is enabled when a voltage at said second terminal of said capacitor falls below a second threshold level.

* * * * *